3,635,872
SOLUTIONS OF NORMALLY CRYSTALLINE
VINYLIDENE CHLORIDE POLYMERS
Ritchie A. Wessling, Midland, Mich., assignor to The
Dow Chemical Company, Midland, Mich.
Filed Dec. 15, 1969, Ser. No. 885,101
Int. Cl. C08f 45/34
U.S. Cl. 260—32.8 R     3 Claims

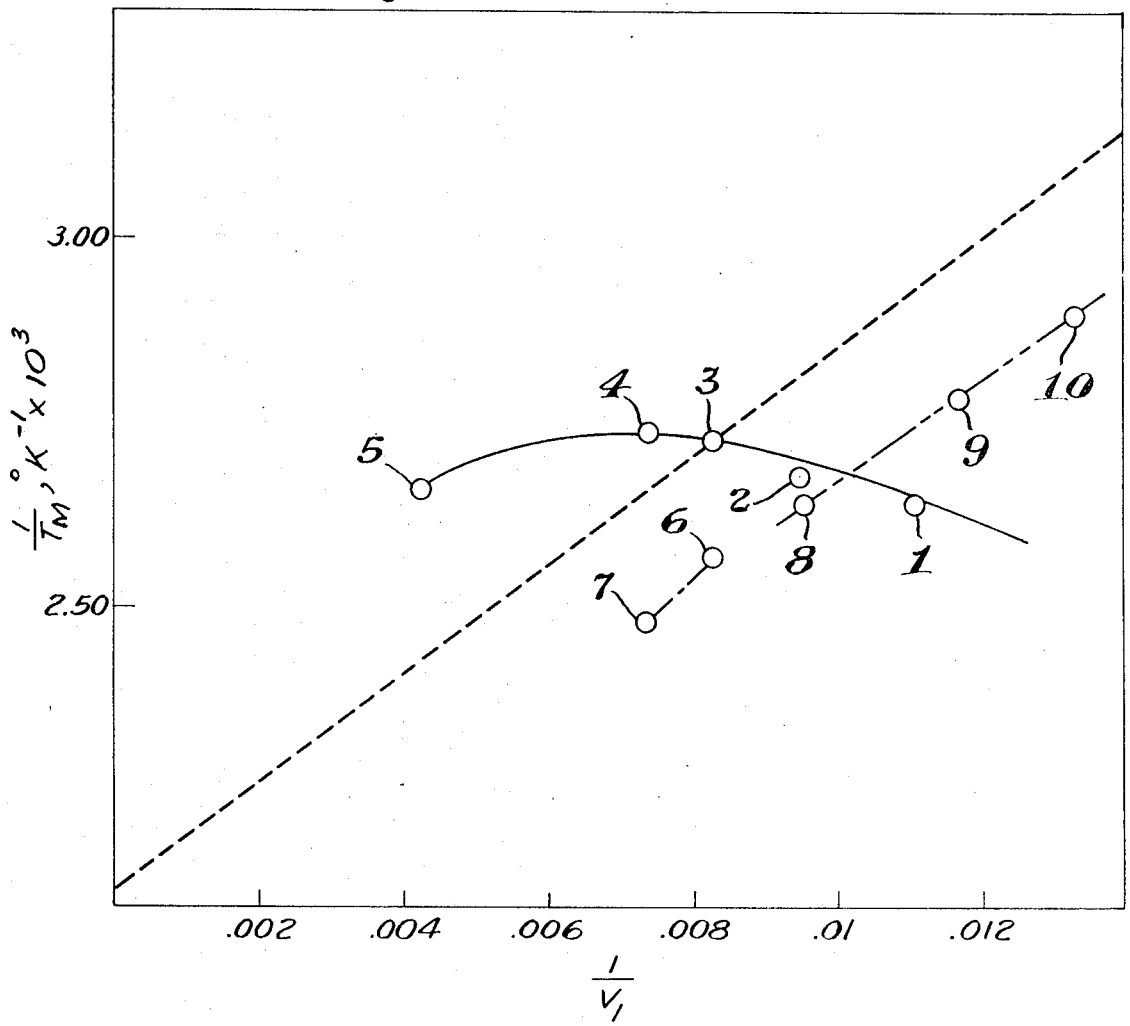

ABSTRACT OF THE DISCLOSURE

This invention relates to new solvents for normally crystalline vinylidene chloride polymers containing at least about 70 weight percent of vinylidene chloride in the polymer molecule and, more particularly, to useful compositions of matter comprising solutions of such vinylidene chloride polymers in one or more cyclic ketones having the formula

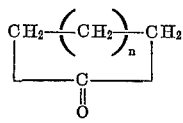

where $n$ is an integer of from 4 through 13.

BACKGROUND OF THE INVENTION

Polyvinylidene chloride as well as the normally crystalline polymers of vinylidene chloride, i.e., those polymers containing at least about 70 weight percent of vinylidene chloride in the polymer molecule, and which exhibit crystallinity when examined by X-ray diffraction methods or between crossed Nicol prisms and compositions prepared therefrom by the inclusion of modifying agents which compositions retain the working characteristics of the crystalline polymers, are known to possess desirable physical and chemical properties such as toughness and insolubility in common solvents. Further, such polymers are generally useful in the formation of synthetic fibers, yarns and films. However, effective solvents have not been readily available for these relatively high softening polymers.

The cyclic ketone, cyclohexanone, is known to be useful as a solvent for the normally crystalline vinylidene chloride polymers, Polymer Handbook, pp. IV-195, Wiley & Son, N.Y. 1966, as such solvent combines the characteristics of a high boiling point and ease of removal from a cast film or spun fiber. This is due to the fact that such solvent is not as polar or strongly associated in the liquid state as compared, for example, to sulfoxide and amide-type solvents. Such cyclic ketone is also characterized by relatively high vapor pressures even at normal room temperatures.

On the other hand, even this solvent is still sufficiently polar to cause degradation of the normally crystalline vinylidene chloride polymers, particularly polyvinylidene chloride, at temperatures necessary to form solutions.

It is an object of this invention, therefore, to provide solutions of normally crystalline vinylidene chloride polymers in solvents having the desirable characteristics of cyclohexanone but wherein such solvents are more effective in dissolving such polymers at lower temperatures.

SUMMARY OF THE INVENTION

The objects of the present invention are accomplished by dissolving a normally crystalline vinylidene chloride polymer containing at least about 70 percent by weight of vinylidene chloride in the polymer molecule in one or more cyclic ketones having the formula:

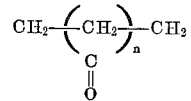

where $n$ is an integer of from 4 through 13.

DESCRIPTION OF THE PREFERRED EMBODIMENTS

The solution temperature (or melting point) of a crystalline polymer in a solvent mixture is commonly described in terms of Flory's theory of melting point depression; P. J. Flory, Principles of Polymer Chemistry, Cornell University, Ithaca, N.Y. 1953, Chapter XIII.

The relationship derived by Flory has recently been elaborated upon by Mandelkern, Crystallization of Polymers, McGraw-Hill, New York (1964), Chapter 3.

The equation written in Mandelkern's terminology is $$\frac{1}{Tm} - \frac{1}{Tm^\circ} = \frac{RVu}{\Delta H u V_1}[1 - v_2 - X_1(1 - v_2)^2]$$

Equation 1 where $Tm$ is the solution temperature and $v_2$ is the volume fraction of polymer in the mixture; R is the gas constant; $Vu$ is the segmental molar volume of the polymer; $\Delta Hu$ is the segmental heat of fusion of the polymer and $Tm^\circ$ is the melting point of pure polymer ($v_2=1$). The latter three (being properties of the polymer) are independent of the type of mixture.

In the above Equation 1, $V_1$ is the molar volume of the solvent and is also independent of the properties of the mixture. The parameter $X_1$ characterizes the non-ideal interaction between polymer and solvent; $X_1<0$ for a solution of a polymer with a good solvent and $X_1>0$ in a solution in a poor solvent. An ideal solution is defined as $X_1=0$. Therefore $X_1$ can be used as a measure of the thermodynamic effectiveness of a solvent.

Solvent effectiveness can be compared by measuring the temperature at which a fixed amount of polymer will dissolve a fixed volume of solvent, i.e., a fixed value of $v_2$ is selected and the solution temperature is measured for the polymer in a series of solvents.

According to Equation 1 above, the preferred means of representing such data is by a plot of $$\frac{1}{Tm} \text{ vs } \frac{1}{V_1}$$

As pointed out by Mandelkern, Crystallization of Polymers, Chapter III, page 40, $Tm$ should increase as the molar volume of the solvent increases, i.e., diluents of lower molar volume should depress the melting point most effectively.

Copolymers tend to be more soluble in good solvents because $Tm^\circ$ is reduced. However, the parameter $X_1$ is affected by the kind and amount of comonomer in the polymer. If $Tm^\circ$ is low or if the copolymer is amorphous, then it will dissolve in many solvents at room temperature provided $X_1<\frac{1}{2}$. If it is substantially crystalline, a good solvent, i.e., where $X_1 \leq 0$ is needed to avoid having to heat to elevated temperatures where degradation can occur.

In a solvent of low polarity, vinylidene chloride polymers containing a more polar component will tend to be less soluble than copolymers with an equivalent amount of a less polar comonomer. For example, polyacrylonitrile will not dissolve in cyclohexanone. Vinylidene chloride/acrylonitrile copolymers tend to become less soluble in cyclohexanone, i.e., $X_1$ increases as acrylonitrile content increases. The opposite occurs with vinyl chloride copolymers. Polyvinyl chloride is quite soluble in cyclohexanone and vinylidene chloride/vinyl chloride copolymers tend to be more soluble, i.e. $X_1$ decreases with increasing vinyl chloride content. Acrylate copolymers behave similarly to vinyl chloride copolymers.

The effectiveness with which a comonomer can reduce $Tm°$ depends on its distribution in the copolymer, and whether it can fit into the crystal structure of the parent polymer. It is well known, e.g., K. Okuda, J. Polymer Sci., 2, 1749 (1964) that vinyl chloride fits into the crystal lattice of polyvinylidene chloride easily. Consequently large amounts of vinyl chloride are needed to depress $Tm°$. Vinylidene chloride/vinyl chloride copolymers, therefore, tend to be less soluble than acrylates. In the latter case, small amounts depress $Tm°$ significantly. Vinylidene chloride/acrylonitrile copolymers exhibits behavior between these two extremes.
exhibit behavior between these two extremes.

In view of these facts, it is possible for a given copolymer to be poorly soluble either because $X_1$ is too large or because $Tm°$ is too high. The factors involved can be identified by use of a $$\frac{1}{Tm} \text{ vs } \frac{1}{V_1}$$

plot.

Example 1

In each of a series of experiments, a wide variety of materials were evaluated as solvents for polyvinylidene chloride and the results tabulated on a $$\frac{1}{Tm} \text{ vs } \frac{1}{V_1}$$

plot choosing $v_2 = 0.01$, as shown on the attached figure. For the ideal case where $X_1 = 0$, Equation 1 reduces to a equation.

$$\frac{1}{Tm} - \frac{1}{Tm°} = \frac{RVu(1-v_2)}{\Delta Hu} \frac{1}{V_1}$$

Equation 2

Such ideal case is represented by the dashed (----) line on the figure. Points falling above this line are thermodynamically improved solvents, i.e., where X is <0.

As mentioned supra, it is known in the art that cyclohexanone is an effective solvent for polyvinylidene chloride. Following the teaching of Mandelkern, cyclopentanone was evaluated on the basis that since it had a lower molar volume than cyclohexanone, it would be a better solvent. Surprisingly, it was found that such was not the case. Thereafter, a series of larger ring cyclic ketones, e.g., cycloheptanone, cyclooctanone and cyclododecanone, were evaluated and found to be thermodynamically better solvents than either cyclopentanone or cyclohexanone, as illustrated by the attached figure. The uniqueness of such discovery is further demonstrated by comparisons with two other series of experiments which are also plotted on the attached figure. In one series the substituted cyclohexanones, 2-methyl cyclohexanone and 2,6-dimethyl cyclohexanone were tested. Their behavior followed the teaching of Mandelkern, i.e., $X_1$ was not significantly changed but $Tm$ increased with $V_1$.

In another series, the cyclic sulfides, pentamethylene sulfide, tetramethylene sulfide and trimethylene sulfide were individually evaluated, as described herein. Again it was found that $X_1$ was not affected to any significant degree by ring size and $Tm$ increased with $V_1$.

Thus, only cyclic ketones of the present invention exhibited an $X_1$ which decreased with ring size, and were, unexpectedly, thermodynamically improved solvents for polyvinylidene chloride.

Example 2

In each of a series of additional experiments, varying concentrations of several polymeric materials were dissolved in a cyclic ketone solvent. The following Table I identifies the polymers, concentrations and solvents used, as well as the minimum solution temperature for each system.

TABLE I

| Experiment No. | Polymer | Solvent | Polymer conc., percent | Solution temperature (Tm, °C.) |
|---|---|---|---|---|
| 1 | 92 wt. percent vinylidene chloride/8 wt. percent acrylonitrile. | Cycloheptanone | 1 | (¹) |
| 2 | 92 wt. percent vinylidene chloride/8 wt. percent acrylonitrile. | Cyclohexanone | 1 | (¹) |
| 3 | 95 wt. percent vinylidene chloride/5 wt. percent acrylonitrile. | Cycloheptanone | 1 | 44 |
| 4 | do | Cyclohexanone | 1 | 52 |
| 5 | 85% vinylidene chloride/15% vinyl chloride. | do | 1 | 68 |
| 6 | do | Cycloheptanone | 1 | 65 |
| 7 | Polyvinylidene chloride | Cyclohexanone | 1 | 99 |
| 8 | do | Cycloheptanone | 1 | 89 |
| 9 | Polyvinyl chloride | Cyclohexanone | 11 | (¹) |
| 10 | do | Cycloheptanone | 11 | (¹) |
| 11 | Polyvinylidene fluoride | Cyclohexanone | 11 | 65 |
| 12 | do | Cycloheptanone | 11 | 70 |
| 13 | Polyvinylidene chloride | Cyclohexanone | 11 | 109 |
| 14 | do | Cycloheptanone | 11 | 99 |

¹ Soluble at room temperature.

The above data (Experiments 1 through 8 and 13–14) illustrate that cyclic ketones of the present invention are significantly improved solvents for the normally crystalline vinylidene chloride polymers as compared with cyclohexanone. Experiments 9 through 12 illustrate that such cyclic ketones are also excellent solvents for polyvinyl chloride and polyvinylidene fluoride and thus are desirable solvents for materials which may be generically described as being normally crystalline and which behave as Lewis acids. The data of Experiments 9 through 14 further illustrate, however, that the cyclic ketones of the present invention unexpectedly exhibit an $X_1$ which increases with ring size only when such materials are used as solvents for the normally crystalline vinylidene chloride polymers.

Example 3

The copolymers of vinylidene chloride and acrylonitrile (as described in Example 2) were dissolved in cycloheptanone to give a viscous solution of 20 grams polymer per 100 ml. solvent and were cast with a 0.007 inch bar and vacuum dried on glass plates at 90° C. The solvent had no apparent effect on the properties of either copolymer. All films were clear and flexible and contained no odor of residual solvent. The copolymer of 85 weight percent vinylidene chloride and 15 weight percent vinyl chloride dissolved at 20 gram/100 ml. in cycloheptanone behave similarly. A film of polyvinylidene chloride was prepared in the same way. It was flexible and transparent but more cloudy than the copolymer films. The cloudiness can be eliminated by coating at higher temperatures or by double coating.

What is claimed is:

1. Compositions of matter consisting essentially of a solution in a cyclic ketone selected from the group consisting of cycloheptanone and cyclooctanone and mixtures thereof of a polymer of a normally crystalline fiber and film forming vinylidene chloride polymer containing at least about 70 weight percent of vinylidene chloride in the polymer molecule.

2. The compositions of claim 1 wherein said vinylidene chloride polymer is polyvinylidene chloride.

3. The compositions of claim 1 wherein said cyclic ketone is cycloheptanone and said normally crystalline vinylidene chloride polymer is selected from the group consisting of polyvinylidene chloride and copolymers of vinylidene chloride and vinyl chloride wherein said copolymers contain at least 80 weight percent of vinylidene chloride.

References Cited

UNITED STATES PATENTS

| | | | |
|---|---|---|---|
| 3,326,838 | 6/1967 | Bolstad | 260—32.8 |
| 3,375,215 | 3/1968 | Kane | 260—32.8 |

MORRIS LIEBMAN, Primary Examiner

P. R. MICHL, Assistant Examiner

PO-1050
(5/69)

UNITED STATES PATENT OFFICE
CERTIFICATE OF CORRECTION

Patent No. 3,635,872           Dated    18 January 1972

Inventor(s)     Ritchie A. Wessling

It is certified that error appears in the above-identified patent and that said Letters Patent are hereby corrected as shown below:

Column 2, line 41, insert --in-- between "solve" and "a".

Column 3, line 17, delete "exhibit behavior between these two extremes."

line 60, insert --linear-- before "equation."

Signed and sealed this 22nd day of August 1972.

(SEAL)
Attest:

EDWARD M. FLETCHER, JR.        ROBERT GOTTSCHALK
Attesting Officer                Commissioner of Patents